Dec. 2, 1958  R. W. ASMUS  2,862,621
PORT MEANS FOR THERMAL DIFFUSION APPARATUS
Filed Dec. 29, 1955  2 Sheets-Sheet 1

INVENTOR.
RICHARD W. ASMUS
BY *Leland S. Chapman*
ATTORNEY

United States Patent Office 2,862,621
Patented Dec. 2, 1958

2,862,621

PORT MEANS FOR THERMAL DIFFUSION APPARATUS

Richard W. Asmus, Cleveland, Ohio, assignor to The Standard Oil Company, Cleveland, Ohio, a corporation of Ohio Application December 29, 1955, Serial No. 556,226

1 Claim. (Cl. 210—176)

The present invention relates to an improved liquid thermal diffusion apparatus and in particular, to an improved port means for use in connection with thermal diffusion apparatus.

Liquid thermal diffusion is a process in which a liquid mixture is separated into two or more fractions having compositions different from that of the original mixture. This separation is accomplished by subjecting a thin film of the liquid mixture to a temperature gradient.

The prior art has suggested various types of apparatus for conducting the thermal diffusion operation. Patent No. 2,541,069 suggests the use of a separation chamber formed by a pair of flat plates. One of the plates of the pair is heated while the other is cooled and the liquid to be separated is introduced into the space formed therebetween. Means are provided for withdrawing the separated fractions from the separation chamber. The present invention relates particularly to plate-type apparatus of the type disclosed in this patent.

One of the problems associated with the use of the plate-type apparatus has been the effective utilization of the entire surface area of the separation chamber for separation. Since one of the plates is uniformly heated while the other is uniformly cooled, a temperature gradient exists at every point in the space defining the separation chamber between the plates. However, unless the liquid to be separated completely fills the separation chamber, a portion of the heat transferred across the separation chamber is wasted and accomplishes no useful effect. Since heat is the principal item of cost in the operation of the process, heat saving or losses are directly reflected in the economies of the process. Accordingly, it is of considerable importance when dealing with the plate-type apparatus to obtain even distribution of the liquid within the separation chamber.

Since the width of a thermal diffusion separation chamber is less than 0.15 and preferably not more than 0.06 inch and oftentimes is considerably less, the flow problems associated with the flow of a liquid through such a chamber are unique. Because of the small volumes necessarily involved and of the criticality of the dimensions of the apparatus, the flow rates through such apparatus are usually very small and flow within the chamber is of necessity laminar rather than turbulent. Accordingly, experience with regard to turbulent flow which is usually encountered in fluid flow problems is of little help in solving the problems arising in the case of laminar flow.

Suggestions have been made in the prior art for improving the distribution of liquid within a plate-type thermal diffusion apparatus. In particular, U. S. Patent No. 2,720,975 which has been assigned to my assignee, discloses the use of knife-edge ports having an opening of uniform width across the face thereof. The port means therein disclosed are usually co-extensive with the breadth of the separation chamber.

It is the object of my invention to provide a port means for a plate-type thermal diffusion apparatus which will provide uniform liquid distribution within the separation chamber.

Another object of my invention is to provide a thermal diffusion apparatus which will operate with a great degree of heat economy.

The mode of attainment of the foregoing and related ends will become apparent from the description below.

In brief, my invention comprises an improved port means for plate-type thermal diffusion apparatus comprising a port which is co-extensive with the breadth of the separation chamber and which has an opening which varies in width across the breadth of the chamber.

The invention will be better understood by reference to the attached patent drawings wherein similar figures denote similar parts throughout and:

Figure 1:
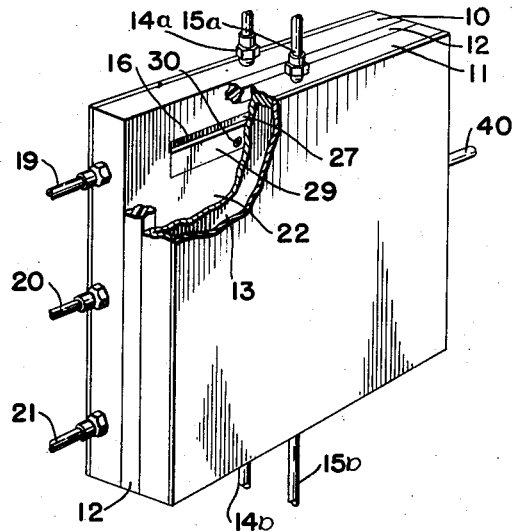
Figure 1 represents an isometric view in partial cross-section of a thermal diffusion apparatus constructed in accordance with this invention.
Figure 3:
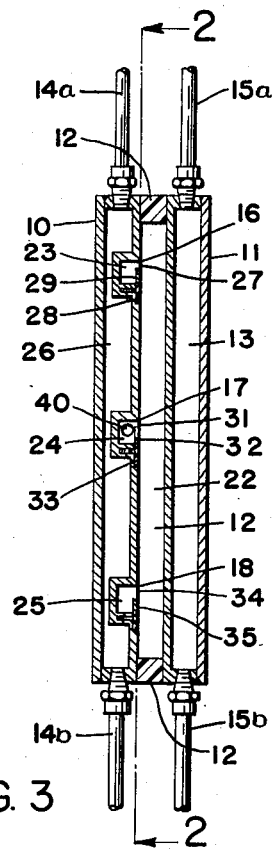
Figure 3 is a cross-sectional view cut on plane 3—3, Figure 2 of the apparatus of this invention.

Referring now to Figure 1, a plate-type thermal diffusion apparatus of the type contemplated herein is made up of the plates 10 and 11 which are urged together and separated by the gasket 12. The gasket 12 may in some instances be provided with a spacing means. A separation chamber 22 is formed, bounded by the gasket and the opposed faces of the plates 10 and 11. The plates 10 and 11 are of approximately the same configuration and are hollow as shown in the cut-away portion of plate 11 which reveals the hollow space 13 (Figures 1 and 3). The hollow space in plate 10 is shown at 26 in Figure 3. The plate 10 is provided with conduit means 14a and 14b which permits the flow of a heat transfer medium therethrough and plate 11 is provided with similar conduit means 15a and 15b by means of which one plate may be relatively heated and the other plate relatively cooled. Other means for heating and cooling the plates may be employed.

Figure 2:
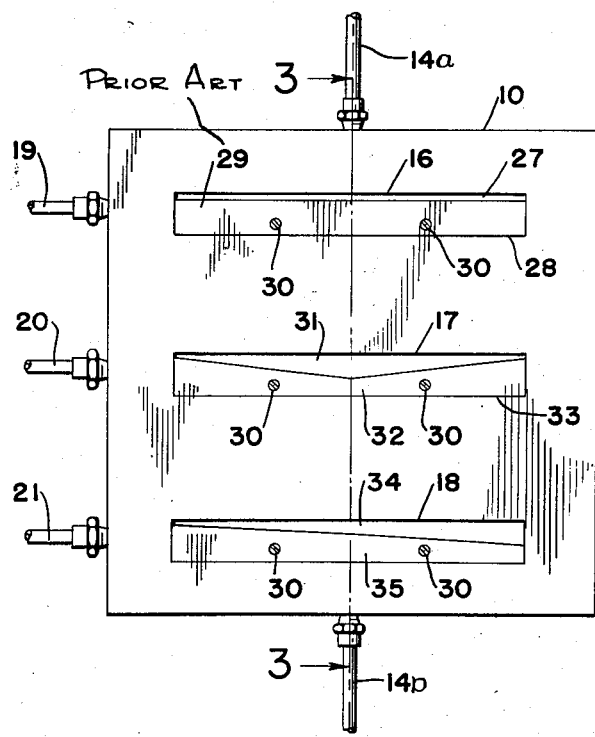
Figure 2 is a front view of one of the plates of such an apparatus showing the improved port means of this invention taken along the line 2—2 of Figure 3.

The plate 10 is also provided with the port means 16 shown on Figure 1 and port means 17 and 18 as shown on Figure 2. The conduits 19, 20, 21, and 40 communicate with the various port means 16, 17 and 18. The liquid which is to be subjected to the thermal diffusion process may be introduced to the separation chamber 22 through the conduit means 20 and 40 and the port 17 and the products of this operation likewise may be withdrawn ultimately through the ports 16 and 18 and the conduits 19 and 21.

Reservoirs 23, 24 and 25, as shown in Figure 3, are provided in the plate 10. These reservoirs communicate with the separation chamber 22 by means of the port means 16, 17 and 18, but not with the hollow space 26 of the plate 10.

The port means 16 shown on Figure 2 is illustrative of the port means disclosed in the prior art. An opening 27 is machined or otherwise provided in one face of the plate 10. Partially surrounding the opening 27 is a recess 28 in the plate 10. The recess 28 is adapted to receive a knife-edge 29 which is held in place by the screws 30. The significant feature of such a prior art port means is that the opening 27 which communicates between the reservoir 23 and the separation chamber 22 is uniform in width across its face.

The preferred embodiment of my invention is illustrated by port means 17. The port means 17 is constructed in a manner similar to that employed for port means 16, an opening 31 being provided in the face of the plate 10. A knife-edge 32 is inserted in the recess 33 partially surrounding this opening and secured by screws 30. The important feature of my invention is that the knife-edge 32 must be tapered from the center to both ends so as to provide a V-shaped opening 31 which varies in width across its face. As a practical matter, it is preferred that the taper of the port be uniform and its narrowest openings are located adjacent to the conduits 20 and 40 which communicate with the reservoir 24.

Another embodiment of my invention is illustrated by the port means 18 shown on Figure 2. The construction of the port means 18 is similar to the construction of the port means 16 and 17 having an opening 34. The knife-edge 35 has a greater width at the end closest to the conduit means 21 than at the furtherest end so as to provide an opening 34 of non-uniform width. The variation in the width of the opening 34 is regular. The narrowest portion of the opening 34 should be adjacent to the conduit means 21 which communicates with the reservoir 25.

Figure 4:
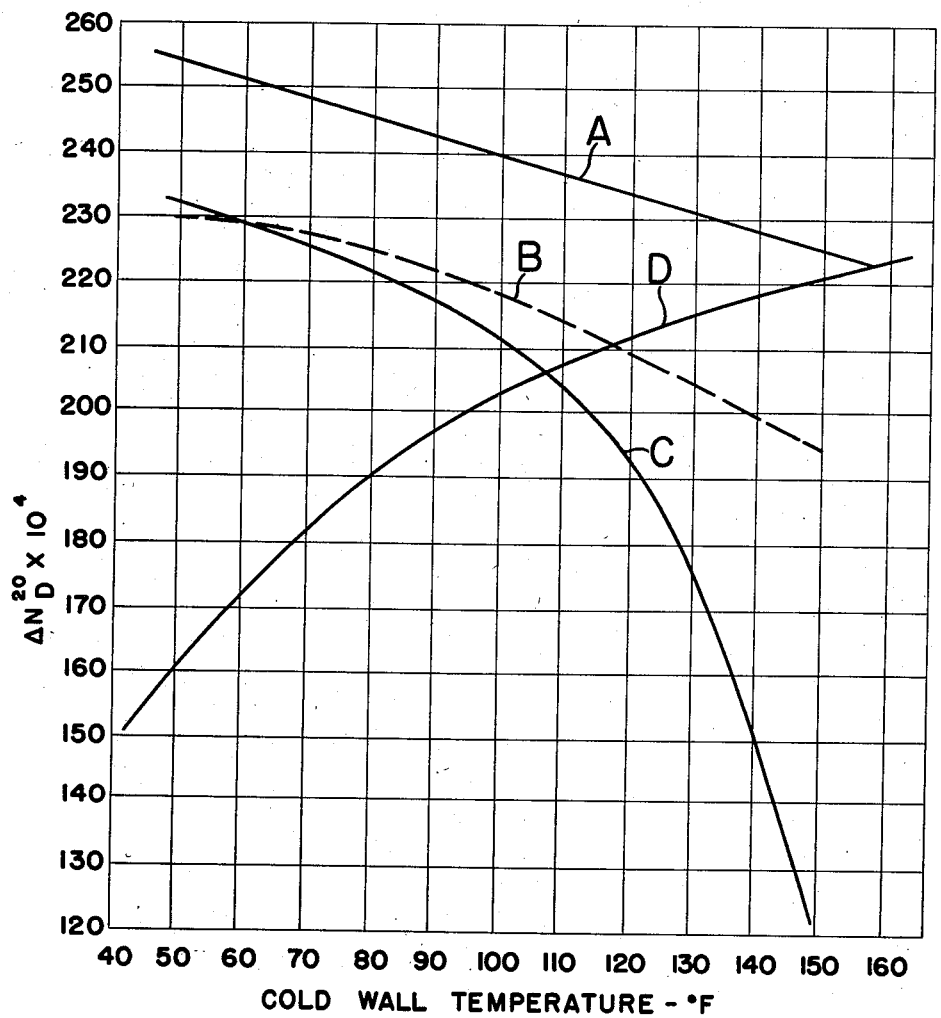
Figure 4 is a graph showing the improvements obtained in the thermal diffusion process by means of this invention as compared to the port means of the prior art.

The improvements made possible in the economy of the thermal diffusion process by means of this invention are illustrated in Figure 4. Referring now to Figure 4, separation as represented by the difference in refractive index between the top and bottom products of a thermal diffusion operation is plotted against the cold wall temperature. The degree of separation obtainable with various port types at varying cold wall temperatures is shown. The unit was a conventional plate type unit of the type illustrated in Figure 1 which was fed at the middle of the separation chamber with products being withdrawn from both the top and bottom of the separation chamber. While the drawing shows the preferred form of the invention applied only to the center (inlet) port, the illustrative example utilized apparatus in which this port construction was also applied to the two outlet ports. All ports were located in the cold wall. The feed stock employed for the purpose of illustrating the improvement made possible by this invention was a 300 red oil, which is a conventionally-refined lubricating oil having a viscosity of 300 SSU at 100° F. as is well known in the art. The unit was fed at the rate of ½ bbl./day and the hot wall temperature was maintained constant at 600° F. The slit width which was likewise maintained constant throughout the runs was about 0.03" as measured at the plate periphery. Runs were made at a number of different cold wall temperatures.

Curve A

The curve A was obtained when a knife-edge opening having a uniform width of .003" was employed. It is noted that the degree of separation was reduced as the cold wall temperature was raised.

Curve B

Curve B was obtained with a port similar to that described under Curve A above except that the width of the opening was doubled to 0.006". The separation obtained with this type of port tended to fall off even more rapidly as the cold wall temperature was raised.

Curve C

With a slightly larger uniform port width of 0.010" the degree of separation fell off quite rapidly as the cold wall temperature was raised.

Curve D

Curve D was obtained in an apparatus employing a port constructed according to the preferred embodiment of my invention and illustrated as port 17 of Figure 2. The V-shaped port had an opening of .0015" at its ends and .0080" at its center. It is noted that the separation obtained in an apparatus employing a port of this design behaved quite contrary to expectations. The degree of separation increased as the cold wall temperature was increased in contrast to the performance of the other ports as here illustrated. This is, of course, quite significant in the operation of the thermal diffusion process. For a given hot wall temperature, the heat economy of the process is increased by increasing the cold wall temperature as this means that less heat is transferred across the slit during the operation of the process. The market contrast between Curve D and the other curves of Figure 4 is manifest and this improvement obtained by the use of a V-shaped port is unusually significant with regard to the thermal diffusion process.

While in the above illustrative example the inlet and outlet ports of a thermal diffusion apparatus were constructed in accordance with this invention, the invention is also applicable to the construction of either the inlet or withdrawal ports. I desire this application for Letters Patent to cover all the modifications of this invention such as will occur to those skilled in the art and reasonably fall within the scope of the appended claim.

I claim:

A thermal diffusion apparatus comprising a pair of plates adapted to accommodate the passage of a heat transfer medium therethrough uniformly spaced apart in sealed relation to provide a thermal diffusion separation chamber therebetween, reservoir means in at least one of said plates, a conduit communicating with one end of said reservoir means, port means communicating with said reservoir means and with said separation chamber, said port means comprising a section secured to the plate containing said reservoir means so as to provide a horizontally elongated opening in the face of said plate, said opening having a width which varies uniformly along its full length, the narrowest width of said opening being nearest said conduit.

References Cited in the file of this patent

UNITED STATES PATENTS

| 1,323,416 | Simpson | Dec. 2, 1919 |
| 1,470,653 | Sullivan | Oct. 16, 1923 |
| 2,720,975 | Jones et al. | Oct. 18, 1955 |

FOREIGN PATENTS

| 726,020 | Great Britain | Mar. 16, 1955 |